I. N. Bunker,
Steering App's.
No. 79,947.  Patented July 14, 1868.
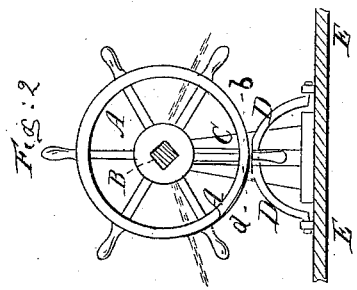
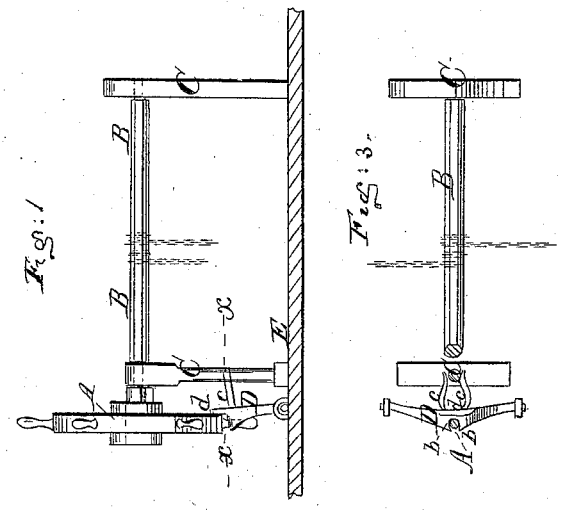
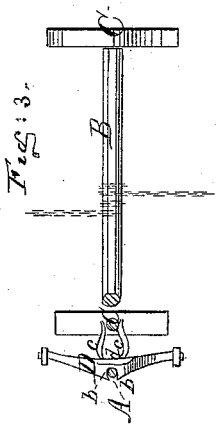
Witnesses:
W. C. Ashkettle
Wm N. Morgan
Inventor:
I. N. Bunker
per Munn & Co
Attorneys

United States Patent Office.

ISAAC N. BUNKER, OF WEYMOUTH, MASSACHUSETTS.

Letters Patent No. 79,947, dated July 14, 1868.

IMPROVEMENT IN STEERING-WHEEL STOPS.

The Schedule referred to in these Letters Patent and making part of the same.

TO ALL WHOM IT MAY CONCERN:

Be it known that I, ISAAC N. BUNKER, of Weymouth, in the county of Norfolk, and State of Massachusetts, have invented a new and improved Ship-Wheel Bracket; and I do hereby declare that the following is a full, clear, and exact description thereof, which will enable others skilled in the art to make and use the same, reference being had to the accompanying drawings, forming part of this specification, in which—

Figure 1 represents a side elevation of my invention.

Figure 2 is a front elevation of the same.

Figure 3 is a detail horizontal sectional view of the same, the plane of section being indicated by the line x x, fig. 1.

Similar letters of reference indicate corresponding parts.

This invention relates to a new manner of locking ships' steering-wheels, when the same are to be retained in any certain position, and consists in the use of a bracket, which is hinged to the deck of the vessel, or to any other suitable stationary apparatus, and which is provided with a notch, which, when the bracket is thrown against the wheel, will fit around one of the spokes or handles of the wheel, and thereby lock it, and prevent it from turning.

The object of the invention is to substitute a convenient device for the ordinary rope-brackets now used.

A represents a steering-wheel, fitted upon a shaft, B, in the ordinary or in any suitable manner; the said shaft having its bearings in upright posts or standards C, as usual.

D is a yoke-shaped bar or plate, hinged with both ends to the deck E of the vessel, or to any other suitable stationary device. The bar or bracket D is arranged between the wheel A and the post C nearest to the same.

A notch, b, is cut in the bracket D, and when the same is turned, so as to rest against the wheel, the notch will catch around one of the spokes or handles of the wheel, as shown in the drawings.

The wheel will thereby be locked and prevented from turning. When the wheel is to be released again, the bracket is thrown against the post C, and the wheel is free to be turned.

Two springs $c\ c$ should be secured to the bracket D, to catch around the post C, whereby the bracket will be held to the post as long as it is not required to lock the wheel.

The apparatus, when arranged as herein described, can be easily operated by the foot, and will be a very convenient and practical attachment to ships of all kinds and dimensions.

A lip, d, should be formed on the upper edge of the bracket, to prevent the said bracket from falling forward when no spoke of the wheel is in the way; said lip then resting against the rim of the wheel, as shown.

I claim as new, and desire to secure by Letters Patent—

1. Arranging a notched hinged bracket D, in combination with the steering-wheel A, substantially as and for the purpose herein shown and described.

2. Providing the bracket D, when the same is made and operating as described, with springs $c\ c$, substantially as and for the purpose herein shown and described.

3. The bracket D, when provided with a lip, d, substantially as and for the purpose herein shown and described.

ISAAC N. BUNKER.

Witnesses:
 A. R. WHITE,
 J. E. HUNT.